Figure 1:
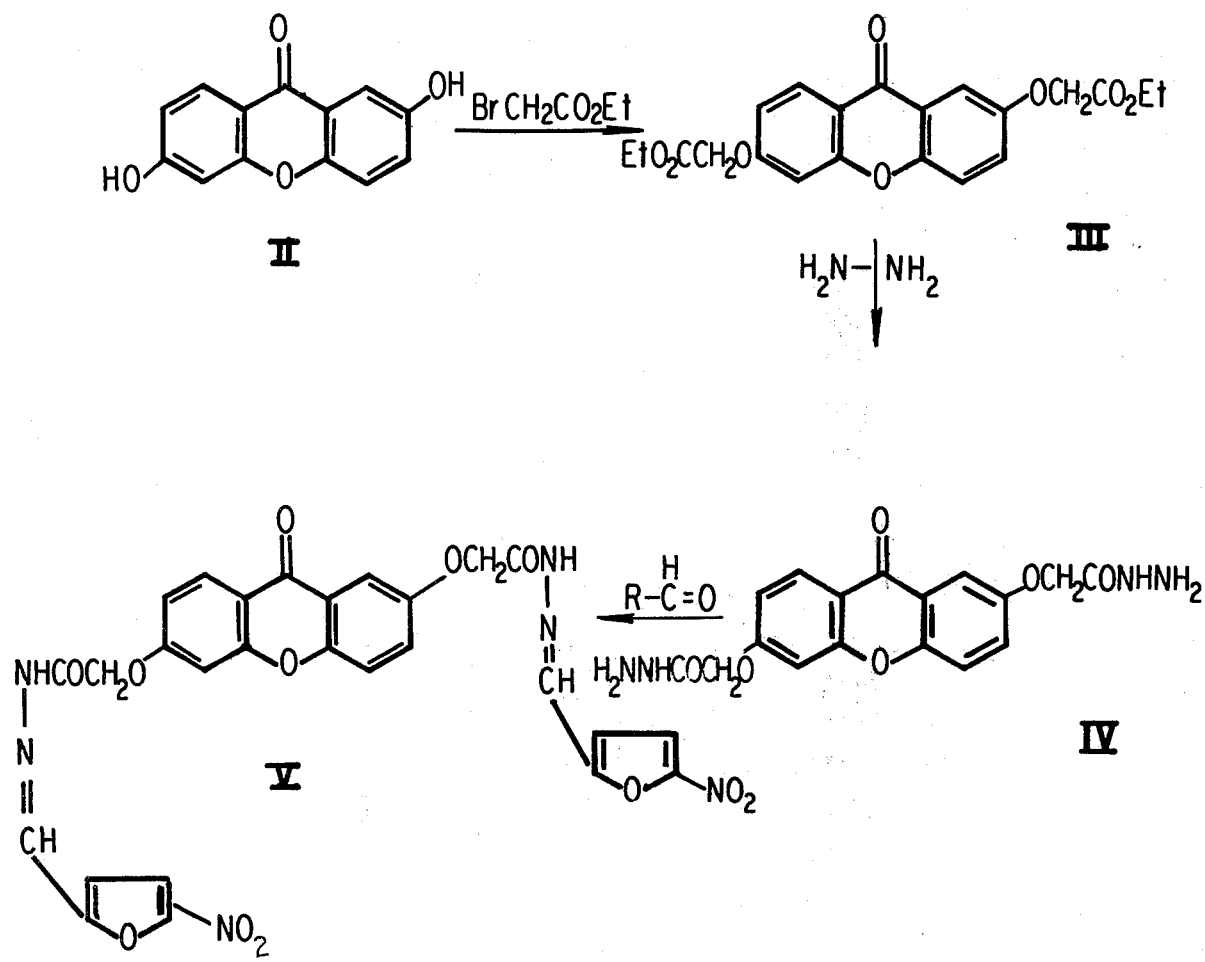

United States Patent [19]

Santilli et al.

[11] 3,917,586
[45] Nov. 4, 1975

[54] [(9-OXOXANTHENE-2,6-DIYL)DIOXY]DIACETIC ACID, DIETHYL ESTER, DIHYDRAZIDES AND DERIVATIVES THEREOF

[75] Inventors: Arthur A. Santilli, Havertown; Anthony C. Scotese, King of Prussia, both of Pa.

[73] Assignee: American Home Products Corporation, New York, N.Y.

[22] Filed: May 8, 1974

[21] Appl. No.: 468,054

[52] U.S. Cl. ...... 260/240.1; 260/240 A; 260/240 G; 260/335
[51] Int. Cl.² .................................. C07D 311/86
[58] Field of Search ............ 260/240 A, 335, 240 G, 260/240.1

[56] References Cited
UNITED STATES PATENTS

| | | | |
|---|---|---|---|
| 2,732,373 | 1/1956 | Steiger | 260/328 X |
| 3,748,326 | 7/1973 | Schwan et al. | 260/240 G X |

FOREIGN PATENTS OR APPLICATIONS

| | | | |
|---|---|---|---|
| 923,132 | 4/1963 | United Kingdom | 260/335 |

Primary Examiner—Allen B. Curtis
Attorney, Agent, or Firm—Joseph Martin Weigman

[57] ABSTRACT

The disclosure is directed to [(9-oxoxanthene-2,6-diyl)dioxy]diacetic acid, diethyl ester, dihydrazides and derivatives thereof which have the formula

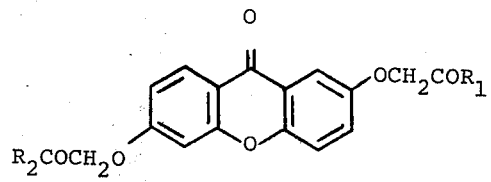

where $R_1$ and $R_2$ are the same and are selected from the class consisting of lower alkyloxy, hydrazino and nitrofurfurylidene hydrazino.

The compounds exhibit antiamebic activity when evaluated in standard pharmacological procedures.

3 Claims, 1 Drawing Figure

[(9-OXOXANTHENE-2,6-DIYL)DIOXY]DIACETIC ACID, DIETHYL ESTER, DIHYDRAZIDES AND DERIVATIVES THEREOF

This invention relates to new and useful [(9-oxoxanthene-2,6-diyl)dioxy]diacetic acid, diethyl ester, dihydrazides and derivatives thereof and their pharmaceutically acceptable addition salts. The chemical structure of the compounds of the invention may be schematically represented by

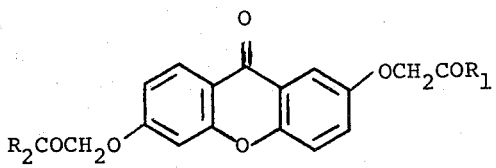

where $R_1$ and $R_2$ are the same and are selected from the class consisting of lower alkyloxy, hydrazino and nitrofurfurylidene hydrazino.

The term "lower alkyl" as used herein refers to straight chain and branched chain groups having 1 to 3 carbon atoms therein.

Specific embodiments of the invention are [(9-oxoxanthene-2,6-diyl)dioxy]diacetic acid diethyl ester, [(9-oxoxanthene-2,6-diyl)dioxy]diacetic acid, dihydrazide and [(9-oxoxanthene-2,6-diyl)dioxy]diacetic acid bis(5-nitrofurfurylidene hydrazide).

The preparation of these compounds may be presented schematically as shown in FIG. 1.

The closest known prior art is contained J. S. DAVIES, F. SCHEINMANN and H. SUSCHITZKY, J. Chem. Soc. 1956, 2140. Also related is British patent 923,132 which is reported in Chemical Abstracts 59 p 9994b. U.S. Pat. No. 2,732,373 is also related.

This starting material 2,6-dihydroxy-9-oxoxanthene, formula I of FIG. 1, is described in O. P. MITTAL and T. R. SESHODRI, J. Sci. Ind. Research (India) 14B, 76 (1966) and in Chemical Abstracts 49, 8932 (1955).

Compounds of the present invention having formula II of FIG. 1 may be prepared by adding 2,6-dihydroxy-9-oxoxanthene to a solution of sodium in ethanol. The ethanol is removed, for instance by evaporation, and the residue dissolved in an inert organic solvent, such as N,N-dimethylformamide. A lower alkyl haloacetate is added and the mixture refluxed for 10 to 120 minutes. Water is added to the reaction mixture, precipitating the product which is recovered and purified, for instance, by filtration and recrystallization.

Compounds of the present invention having formula III of FIG. 1 may be prepared as follows. A mixture of a compound having formula II of FIG. 1 and a few milliliters of hydrazine hydrate in an inert organic solvent, such as ethanol, are heated under reflux for 1 to 3 hours, preferably 2 hours. The product is recovered and purified, for instance, by filtration and recrystallization.

The compound of the present invention having formula IV of FIG. 1 may be prepared as follows. A mixture of a compound having formula III of FIG. 1 and 5-nitro-2-furaldehyde in glacial acetic acid are heated under reflux for ½ to 2 hours, preferably one hour. The product is recovered and purified, for instance, by filtration, washing with petroleum ether, and recrystallization.

In the pharmacological evaluation of the biological activity of the compounds of this invention, the in vitro effects are tested as follows. The test substance is incorporated and diluted in the aqueous phase of modified Boeck-Drbohlav diphasic medium fortified with rice starch. The medium is innoculated with polybacteria, and a known number of trophozolites of *Endameba histolylica* NIH 200. After 48 hours incubation at 35°C. the trophozolites are counted. The minimal inhibitory concentration (MIC) expressed in micrograms per milliliter (μg/ml) is the least amount of a tested compound that completely inhibits E. Histolytica. The activity of the compounds is compared against emetine hydrochloride (3.90) as a standard. This procedure is suggested in Thompson et al, Antibio. & Chemo. 6 (1956) 337–50. Some of the compounds of the present invention were found to produce a 91 percent kill at an MIC of 250. All of the substances produced at least a 15 percent kill at 250 MIC.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. In the examples, all temperatures are stated in degrees centigrade, and the following abbreviations are used: "g." for grams, "ml." for milliliters, "min." for minutes, "hr." for hours, "Me" for methyl group and "Et" for ethyl group.

EXAMPLE I

This example illustrates the preparation of [(9-oxoxanthene-2,6-diyl)dioxy]diacetic acid diethyl ester a compound of formula III:

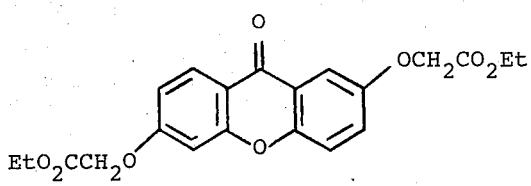

To a solution of 1.84 g of sodium in 200 ml of ethanol was added 9.12 g of 2,6-dihydroxy-9-oxoxanthene. The ethanol was removed in a rotary evaporator and the residue dissolved in 150 ml of N,N-dimethylformamide. Ethyl bromoacetate (13.66 g) was added and the mixture refluxed for 30 minutes. The mixture was poured into 300 ml of water and the precipitate collected. Recrystallization of 5 g of this filter cake afforded 3.7 g of product having a melting point of 147°–150°.

Based on the assumed molecular formula $C_{21}H_{20}O_8$ it was calculated that the elemental analysis by weight would be 62.99 percent carbon and 5.04 percent hydrogen. The product was analyzed and found to contain 62.83 percent carbon and 4.99 percent hydrogen which confirmed the accuracy of the assumed formula. This may be expressed:

Anal. Calcd. for $C_{21}H_{20}O_8$: C, 62.99; H, 5.04. Found: C, 62.83; H, 4.99.

When assayed in the foregoing pharmacological procedure, the product was found to cause a 15 percent kill at 250 MIC.

EXAMPLE II

This example illustrates the preparation of [(9-oxoxanthene-2,6-diyl)dioxy]diacetic acid, dihydrazide a compound of formula IV:

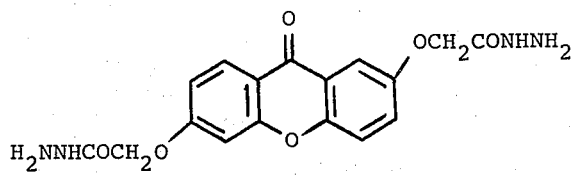

A mixture of 3.7 g of [(9-oxoxanthene-2,6-diyl)dioxy]diacetic acid diethyl ester in 150 ml of ethanol and a few ml of hydrazine hydrate was heated under reflux for 2 hours. The mixture was filtered and the filter cake recrystallized from N,N-dimethylformamide to give 4.2 g of product which decomposed at 265°–268°C.

Anal. Calcd for $C_{17}H_{16}N_4O_6$: C, 54.84; H, 4.33; N, 15.05. Found: C, 54.62; H, 4.41; N, 15.03.

When assayed in the foregoing pharmacological procedure the product was found to cause a 91 percent kill at 250 MIC.

EXAMPLE III

This example illustrates the preparation of [(9-oxoxanthene-2,6-diyl)dioxy]diacetic acid bis(5-nitrofurfurylidene hydrazide) a compound of formula V:

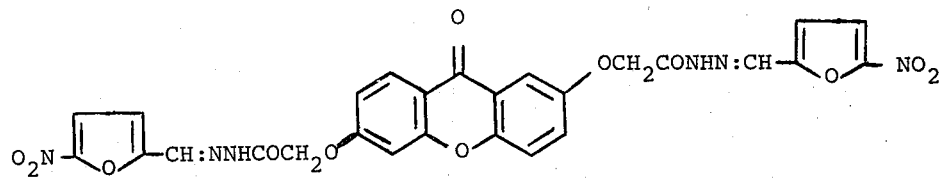

A mixture of 7.4 g of [(9-oxoxanthene-2,6-diyl)dioxy]diacetic acid hydrazide, 5.6 g of 5-nitro-2-furaldehyde in 300 ml of glacial acetic acid was heated under reflux for 1 hour. The mixture was filtered and the filter cake washed well with petroleum ether. This solid was recrystallized from 200 ml of N,N-dimethylformamide with 100 ml of ethanol added to induce precipitation affording 4.1 g of product which decomposed at 296°–299°.

Anal. Calcd for $C_{27}H_{18}N_6O_{12}$: C, 54.43; H, 2.98; N, 13.66. Found: C, 52.66; H, 3.02; N, 13.41.

When analyzed in the foregoing pharmacological procedure the product was found to cause a 22 percent kill at 250 MIC.

What is claimed is:

1. A compound selected from those having the formula

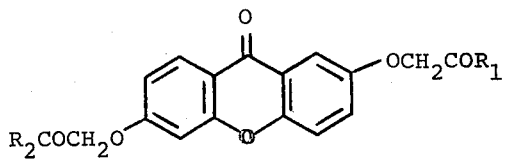

where $R_1$ and $R_2$ are the same and are selected from the class consisting of hydrazino and nitrofurfurylidene hydrazino; and its pharmaceutically acceptable acid addition salts.

2. A compound as defined in claim 1 which is [(9-oxoxanthene-2,6-diyl)dioxy]diacetic acid, dihydrazide.

3. A compound as defined in claim 1 which [(9-oxoxanthene-2,6-diyl)dioxy]diacetic acid bis(5-nitrofurfurylidene hydrazide).

* * * * *